Oct. 17, 1967

T. CYMMER ETAL 3,347,091

GRIP FOR COMPRESSION TESTING

Filed Oct. 19, 1965

INVENTORS.
THOMAS CYMMER
NATHAN FRIED
BY

ATTORNEYS

Oct. 17, 1967  T. CYMMER ETAL  3,347,091
GRIP FOR COMPRESSION TESTING

Filed Oct. 19, 1965  3 Sheets-Sheet 2

INVENTORS.
THOMAS CYMMER
NATHAN FRIED
BY

ATTORNEYS

Oct. 17, 1967 T. CYMMER ETAL 3,347,091
GRIP FOR COMPRESSION TESTING
Filed Oct. 19, 1965 3 Sheets-Sheet 3

INVENTORS.
THOMAS CYMMER
NATHAN FRIED
BY
John N. Pease
ATTORNEYS

3,347,091
GRIP FOR COMPRESSION TESTING
Thomas Cymmer, Jersey City, N.J., and Nathan Fried, Brooklyn, N.Y., assignors to the United States of America as represented by the Secretary of the Navy
Filed Oct. 19, 1965, Ser. No. 498,160
2 Claims. (Cl. 73—103)

The invention described herein may be manufactured and used by or for the Government of the United States of America for governmental purposes without the payment of any royalties thereon or therefor.

This invention relates to grips for compression testing where a firm mechanical hold is desired between the grip and a specimen being tested.

Conventional devices for gripping a specimen to be tested, notably in tensile testing apparatus, have utilized pairs of gripping jaws slidably mounted in a cam surfaced holding fixture.

In the adoption of this principle to compression testing of elongated test specimens such as parallel filament-reinforced plastic, it has been found that, to approach repeatable accurate results in testing, the gripping device must be unduly large and heavy and even under such conditions, repeatable accurate results have been difficult to obtain.

It is an object of the present invention to provide a grip structure for holding an elongated test specimen in compression test under heavy loads, as for example, 15,000 to 30,000 lbs. which will produce repeatable results of improved accuracy as compared to results obtained from conventional grip structures.

A further object is to provide an improved grip structure which will produce improved results while maintaining the required size and weight of the grip structure at a minimum.

A still further object is to provide an improved grip structure which will preclude or minimize deviations from ideal dimensions and symmetry of the grip structure under load, such that improved accuracy and repeatability of compression test results is obtained.

Other objects and advantages will appear from the following description including drawings of examples of the invention, and the novel features will be particularly pointed out in the appended claims.

In general, applicants' invention comprises an arrangement and association of parts wherein prestressed, i.e. preloaded support elements, are utilized in critical stress areas of the grip structure.

Figures 1, 2:
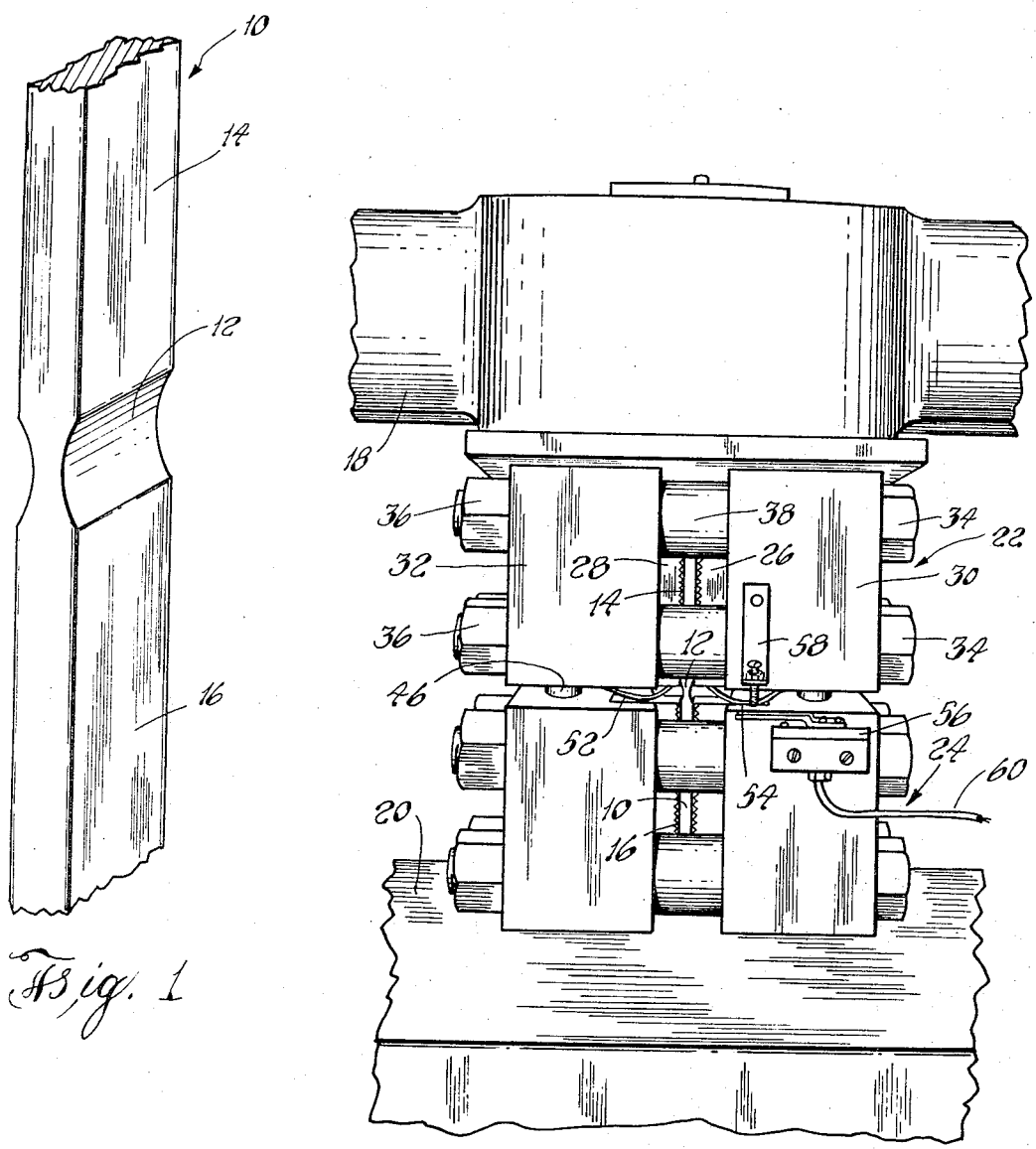
FIG. 1 is a perspective view of a typical specimen to be compression tested.
FIG. 2 is a perspective view of a grip structure incorporating the present invention shown in operative position between the relatively movable elements of a compression testing machine and holding a specimen to be compression tested.

Referring to FIG. 1 of the drawings, there is shown an elongated test specimen 10 of material to be compression tested, the test specimen having the usual central test area 12 of reduced and graduated cross-section to avoid localized stress areas and the usual flat-sided end portions 14 and 16 to be gripped in the gripping structure of the present invention. The test specimen forms no part of the present invention and is illustrated in FIG. 1 for a better understanding of applicants' device and its operation.

In FIG. 2 of the drawing, there is indicated by the numerals 18 and 20, the upper and lower platens of a tensile/compression tester (not shown) between which applicants' device is positioned to receive compressive force resulting from relative movement of the platens toward each other. The tensile/compression tester is operated by an electric motor (not shown). The remainder of the tensile/compression tester bears no specific relation to the present invention and has been omitted from the drawings to simplify the same.

In FIG. 2 are shown two sets of gripping structure, an upper and a lower set, indicated respectively at 22 and 24. Since the two sets are essentially identical, a description of one will suffice.

The gripping structure 22 includes a pair of jaw members 26 and 28 and a fixture for slidably receiving the jaw members and comprising separate guide members 30 and 32 and means, such as bolts 34, nuts 36 and spacer collars 38, for fixing the position of the guide members 30 and 32.

Figure 3:
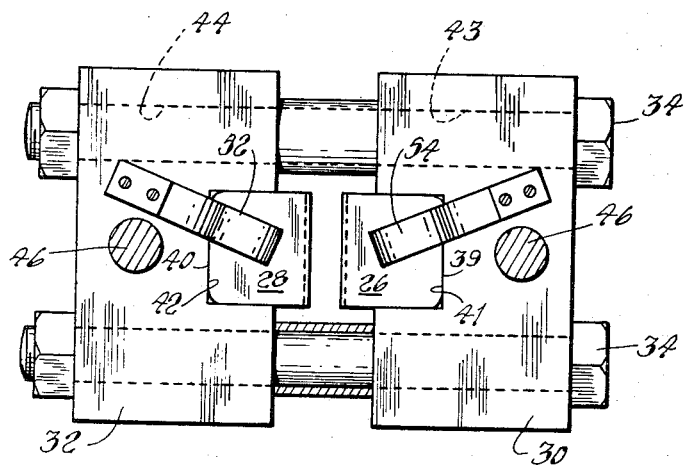
FIG. 3 is a bottom view taken on line 3—3 of FIG. 2.
Figure 4:
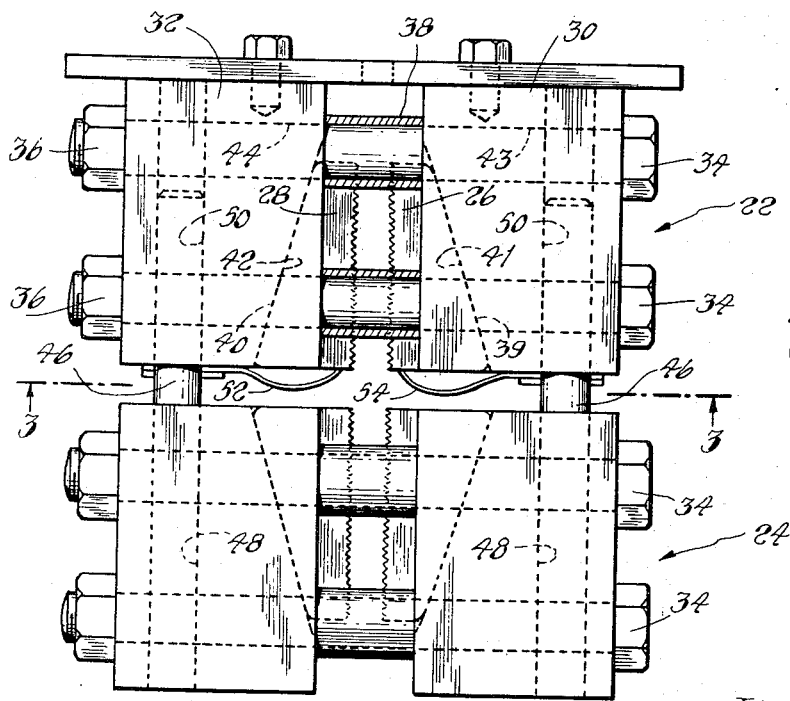
FIG. 4 is a front view of the grip structure of FIG. 2.
Figure 5:
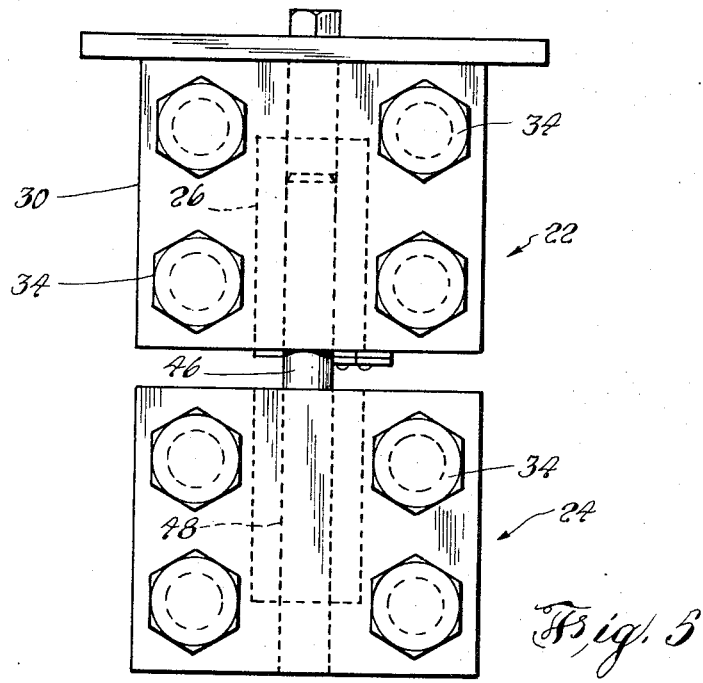
FIG. 5 is a side view of the grip structure of FIG. 2.

The jaw members 26 and 28 are formed with outwardly facing sides 39 and 40 converging toward the longitudinal axis of test specimen in a direction opposite the direction of load application to the test area 12 of the specimen. Cooperatively, the guide members 30 and 32 are grooved as shown in FIG. 3 to slidably receive the jaw members 26 and 28 and formed with guide surfaces 41 and 42 parallel to the jaw member converging sides to urge the jaw members toward closed gripping position as the jaw members are moved inwardly in the guide members.

The spacer collars 38 are provided as stop means preventing inward movement of the guide members 30 and 32. The bolts 34 are passed through aligned apertures 43 and 44 in the guide members and through each associated spacing collar. In accordance with the present invention, the bolts are tightened to stress-loaded condition (during assembling of the gripping structure) of a value in excess of the maximum gripping force to be exerted on the test specimen such that the guide members can have virtually no outward spread during test of the specimen. In this respect, the stress-loaded bolts 34 form critical and main frame members of the jaw positioning fixture maintaining the jaws in correct vertical position and maintaining the gripping faces of the jaws parallel.

The upper grip set 22 is guided and maintained in alignment with the lower set 24 by guide rods 46 received in aligned passages 48 and 50 of the guide members. Springs 52 and 54 mounted respectively on the guide members 32 and 30 engage the jaws 28 and 26 to urge the jaws into the guide members. A limit switch 56 and actuator 58 mounted respectively on the jaw sets 24 and 22 and electrically connected by lead 60 to the electric motor (not shown) of the tensile/compression tester indicated, provide means for limiting relative movement of the jaw sets to avoid mechanical damage.

Figure 6:
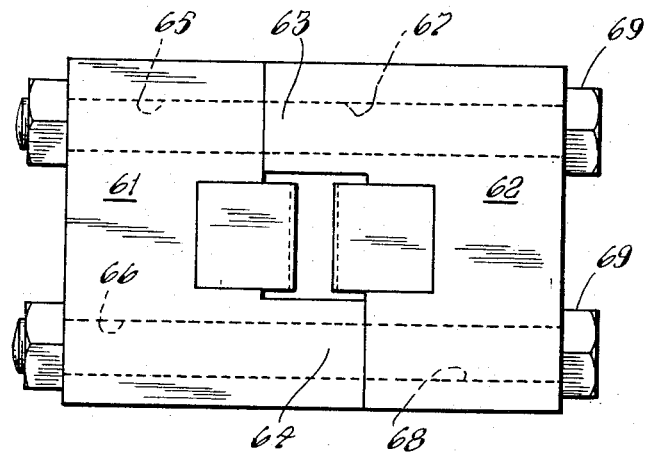
FIG. 6 is a plan view of a modified form of grip structure incorporating the invention.

It is understood that any suitable stop means may be employed to fix the spacing of the guide members. For example, as shown in FIG. 6, L-shaped guide members 61 and 62 could be employed such that the projection portions 63 and 64 thereof form suitable spacer or stop means. In this modification, passageways 65 and 66 in guide member 61 are formed for alignment with passageways 67 and 68 of guide member 62 to receive tensile loaded bolts 69. U-shaped could also be used.

In considering the advantages provided by the present invention, it is to be noted that wedge grips supported in conventional guide fixtures develop nonuniform load distribution along the gripping surfaces in the longitudinal and transverse directions of the specimen. The nonuniformity results from a number of factors including deviations in the fixture parts and specimens from ideal dimensions and symmetry, from irregularity and flaws in specimens and from differences in dimensions and compositions among specimens. The result is that constancy of parallelism of the gripping surfaces of the jaw members is not maintained and the specimen test results are inaccurate and not repeatable. This effect can be minimized in conventional fixtures only by making the fixture parts prohibitively bulky and heavy or by using materials with a modulus of elasticity much greater than that of steel. The latter alternative is impractical and uneconomical, if not impossible, with present technology of materials.

According to the present invention, the abovementioned difficulties are eliminated by providing a grip structure with a guide fixture in which the transverse connecting members are adjusted in preload tensile stress to a value such that the guide members cannot move under load conditions within the range of loads for which the grip structure is designed. This result is obtained without an impractical increase in the size and weight of the grip device and without the need for materials of greater modulus of elasticity than steel.

It will be understood that various changes in the details, materials and arrangements of parts, which have been herein described and illustrated in order to explain the nature of the invention, may be made by those skilled in the art within the principle and scope of the invention as expressed in the appended claims.

We claim:
1. A grip structure for transversely clamping one end of an elongated specimen to be subject to compression test along its longitudinal axis in a load application direction comprising:
   a pair of jaw members positioned to receive therebetween said one end of said test specimen,
   said jaw members having outwardly facing sides converging toward said longitudinal axis in a direction opposite said load application direction,
   a fixture including separate guide members formed with guide surfaces parallel to said jaw member sides to slidably received said jaw members and means fixing the position of said guide members,
   said fixing means including stop means comprising a plurality of spacer collars positioned between said guide members for preventing inward movement of said guide means toward said longitudinal axis,
   adjustable tension connecting means comprising a plurality of bolts and nuts connected between said guide means, said guide members being apertured transversely to pass said bolts through said guide members and spacing collars and adjusted in tension to a value greater than the maximum outward transverse thrust developed from said specimen under compression test such that said guide members can have no outward spread during testing of said specimen.

2. A grip structure for transversely clamping opposite ends of an elongated specimen to be subject to compression test along its longitudinal axis in a load application direction comprising:
   cooperative sets of aligned clamping means for clamping the respective ends of said specimen, each set including:
   a pair of jaw members positioned to receive therebetween one end of the test specimen,
   said jaw members having outwardly facing sides converging toward said longitudinal axis in a direction opposite said load application direction,
   a fixture including separate guide members formed with guide surfaces parallel to said jaw member sides to slidably receive said jaw members and means fixing the position of said guide members,
   said fixing means including stop means comprising a plurality of spacer collars positioned between said guide members for preventing inward movement of said guide means toward said longitudinal axis,
   adjustable tension connecting means comprising a plurality of bolts and nuts connected between said guide means, said guide members being apertured transversely to pass said bolts through said guide members and spacing collars and adjusted in tension to a value greater than the maximum outward transverse thrust developed from said specimen under compression test such that said guide members can have no outward spread during testing of said specimen,
   means for guiding said sets toward and away from each other along said longitudinal axis of said test specimen.

References Cited
UNITED STATES PATENTS

| 308,659 | 12/1884 | Emery | 73—103 |
| 2,419,711 | 4/1947 | Dillon | 73—103 |
| 2,424,177 | 7/1947 | Lawshe et al. | 73—103 |
| 2,669,868 | 2/1954 | Shneider | 73—103 |

JAMES J. GILL, *Acting Primary Examiner.*

RICHARD C. QUEISSER, *Examiner.*

J. D. SCHNEIDER, *Assistant Examiner.*